United States Patent

Beyers et al.

[15] 3,699,529

[45] Oct. 17, 1972

[54] COMMUNICATION AMONG COMPUTERS

[72] Inventors: Billy Wesley Beyers, Greenfield; Larry Lee Roy Tretter, Indianapolis, both of Ind.

[73] Assignee: RCA Corporation

[22] Filed: Jan. 7, 1971

[21] Appl. No.: 104,626

[52] U.S. Cl. ....................340/172.5

[51] Int. Cl. ....................G06f 15/16, G05b 23/02

[58] Field of Search ....................340/172.5

[56] References Cited

UNITED STATES PATENTS

| | | | |
|---|---|---|---|
| 3,517,130 | 6/1970 | Rynders | 179/15 |
| 3,445,822 | 5/1969 | Driscoll | 340/172.5 |
| 3,480,914 | 11/1969 | Schlaeppi | 340/172.5 |
| 3,374,465 | 3/1968 | Richmond et al. | 340/172.5 |
| 3,386,082 | 5/1968 | Stafford et al. | 340/172.5 |
| 3,521,238 | 7/1970 | Gunderson | 340/172.5 |
| 3,348,210 | 10/1967 | Ochsner | 340/172.5 |
| 3,534,337 | 10/1970 | Martin et al. | 340/172.5 |

*Primary Examiner*—Paul J. Henon
*Assistant Examiner*—Paul R. Woods
*Attorney*—H. Christoffersen

[57] ABSTRACT

Multiple computer system in which a control signal manifestation is circulated by a single control line from one computer to the next to indicate that the computer receiving the control signal manifestation may have available to it for communication with another computer a common communications channel. If, upon receipt of a control signal manifestation, a computer desires to transmit via the channel, it "-captures" the control signal manifestation. If not, or after a computer has completed its communication, it returns the control signal manifestation to the single control line for passage to the next computer.

3 Claims, 5 Drawing Figures

INVENTORS
Billy W. Beyers Jr. &
Larry L. Tretter
BY [signature]
ATTORNEY

INVENTORS
Billy W. Beyers Jr. &
Larry L. Tretter
BY
ATTORNEY

INVENTORS
Billy W. Beyers Jr. & Larry L. Tretter
BY [signature]
ATTORNEY

COMMUNICATION AMONG COMPUTERS

BACKGROUND OF THE INVENTION

In a computer controlled manufacturing process there may be a number of computers, each controlling a different step in the process. If the steps are interrelated, it is often necessary for one computer to communicate with another to indicate, for example, adjustments which must be made in the manufacturing process. In a system of this type, there may be a common channel for handling all such communications and it is necessary that not more than one computer transmit via the channel at any one time. Therefore, means must be provided for indicating to each computer when the communications channel is busy and when a computer which desires access to the channel may transmit information via the channel.

It is sometimes necessary in a system of the type described above to add additional computers to the system or, in some cases, to remove computers from the system. Means must be provided for permitting this to be done quickly and economically while still retaining the ability of the computers to be aware of when the communications channel is busy and when it is free. Moreover, the programming required for each computer should not require extensive changes when adding or removing computers from the system.

The purpose of the present invention is to meet the need above in a relatively simple and efficient way.

SUMMARY OF THE INVENTION

In a system which includes *N* computers there are *N* control circuits, each connected to a different computer. Each $j$'th such circuit has an input terminal connected to the output terminal of the $j \ominus 1$'th control circuit and an output terminal connected to the input terminal of the $j \oplus 1$'th control circuit. There are means in each control circuit receptive of a signal manifestation at its input terminal for applying a corresponding signal manifestation to its output terminal when its computer does not desire to communicate via a common communications channel. There are also means in each control circuit responsive to a signal from its computer requesting access to said channel for indicating to its computer, upon receipt of a control pulse, that it may have access to said channel and for concurrently preventing that control circuit from applying said corresponding signal manifestation to its output terminal until the computer has completed its period of access to the channel.

DETAILED DESCRIPTION

Figure 1:
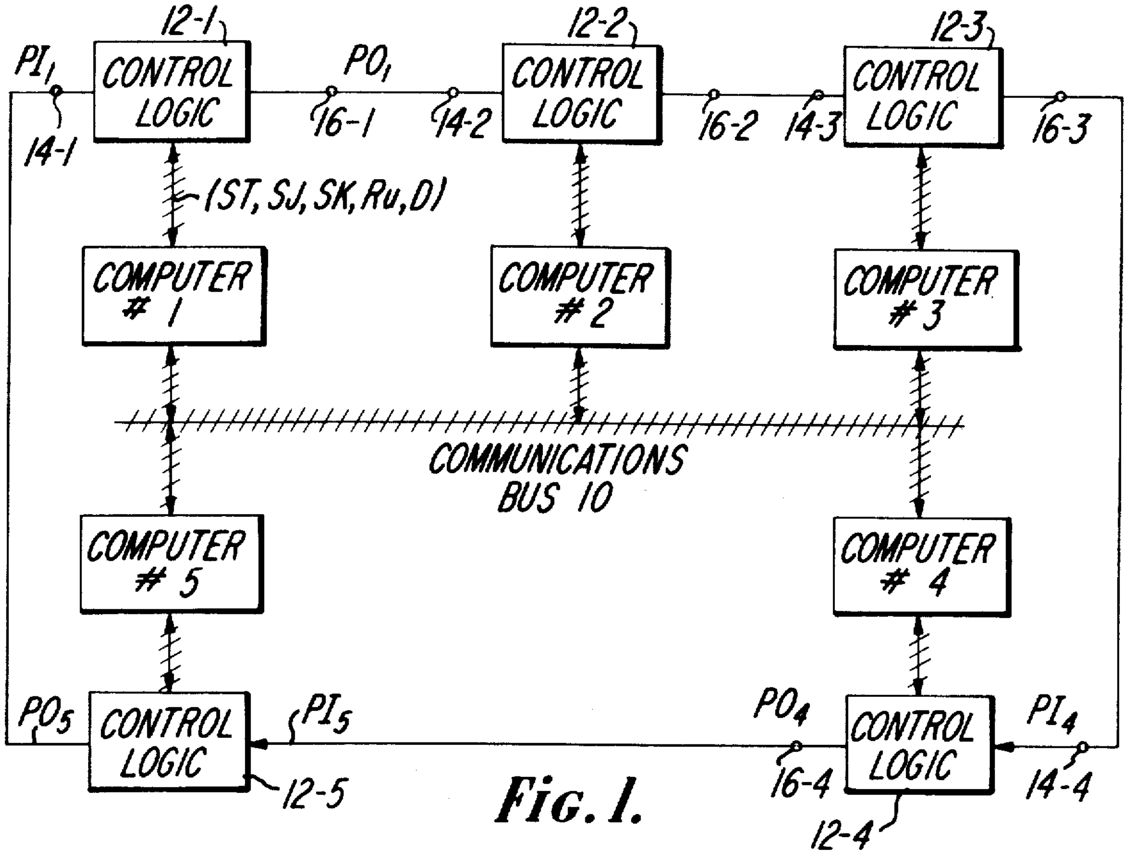
FIG. 1 is a block diagram of a computer system embodying the invention.

The multiple computer system of FIG. 1 is shown by way of example to have five computers legended computer No. 1 . . . computer No. 5. The computers are all connected to a common communications bus 10. The computers employed may be commercially available systems such as PDP—8's and/or RCA Model No. 1600's, as examples and no two such computers may transmit via the communications bus at the same time.

The present invention provides a new and improved solution to the problem above. It includes control logic circuits 12-1, 12-2, . . . 12-5, each such circuit connected via a multiple conductor bus to a different computer. Each such circuit has an input terminal 14 (14-1, 14-2 and so on) at which it receives an input pulse PI and an output terminal 16 (16-1, 16-2 and so on) at which it produces an output pulse PO. Each output terminal 16 is connected to the input terminal 14 of the next circuit. In mathematical terms, the output terminal of each $j$'th control logic circuit is connnected to the input terminal of the $j \oplus 1$'th logic circuit, where $\oplus$ means modulo addition and $j=1, 2, 3, 4, 5$. The control logic circuits are identical so that only one of them need be described. It is shown in FIG. 2.

Figure 2:
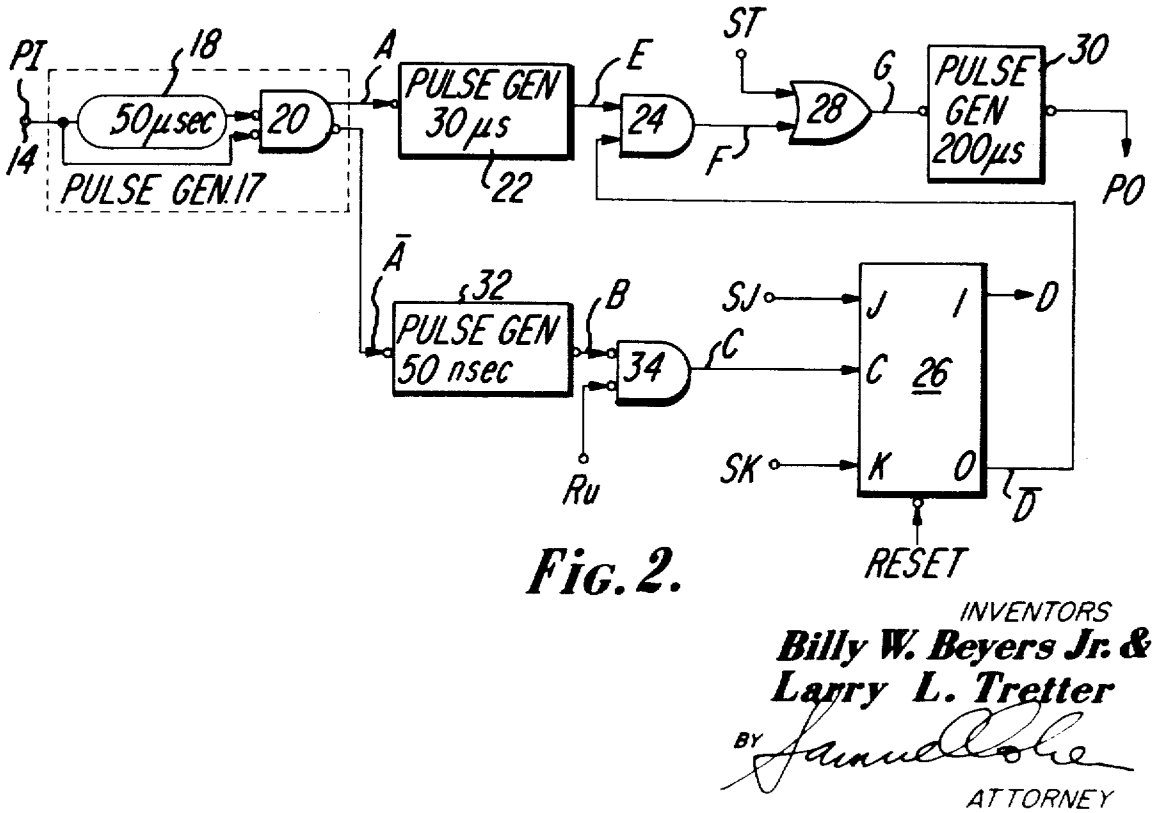
FIG. 2 is a block diagram of an embodiment of a control logic circuit according to the invention.

The circuit of FIG. 2 includes a pulse generator 17 consisting of a 50 microsecond delay means 18 such as a delay line and a NOR/OR gate 20. The purpose of this pulse generator is to produce an output pulse A (and its complement $\overline{A}$) only when the input pulse at terminal 14 is longer than a given interval — 50 microseconds in the present instance. Pulses narrower than this are considered to be noise spikes.

The NOR gate output signal A is applied to pulse generator 22. The latter is one of the type which responds to the lagging edge of pulse A and which produces a 30 microsecond output pulse E. The pulse E serves as one input to AND gate 24, the second input being the output $\overline{D}$ of JK flip-flop 26. The output signal F produced by gate 24, when this signal is present, is applied to OR gate 28. The latter applies its output pulse G to pulse generator 30.

The OR gate output $\overline{A}$ of gate 20 is applied to pulse generator 32. The latter produces a 50 nanosecond negative-going pulse B in response to the leading edge of the signal $\overline{A}$. This short pulse B serves as one input to NOR gate 34. The second input RU to the NOR gate is a direct voltage level which is negative-going when the computer connected to this particular control logic circuit is operating. The output signal C of the gate 34 is applied to the C (clock) input terminal of flip-flop 26.

The JK flip-flop 26 is one of the type which operates according to the following truth table. In this table, the "next state" is the one assumed by the flip-flop in response to the next C=1 pulse. $\phi$ in the table means "-don't care."

| | INITIAL STATE | | | | NEXT STATE | |
|---|---|---|---|---|---|---|
| | D | $\overline{D}$ | SJ | SK | D | $\overline{D}$ |
| (1) | 1 | 0 | 0 | 0 | 1 | 0 |
| (2) | 0 | 1 | 0 | 0 | 0 | 1 |
| (3) | $\phi$ | $\phi$ | 0 | 1 | 0 | 1 |
| (4) | $\phi$ | $\phi$ | 1 | 0 | 1 | 0 |
| (5) | 0 | 1 | 1 | 1 | 1 | 0 |
| (6) | 1 | 0 | 1 | 1 | 0 | 1 |

In addition to the above, the JK flip-flop 26 has a reset terminal. In response to a negative pulse applied to this terminal, the flip-flop becomes reset ($D=0$, $\overline{D}=1$) in the absence of a $C=1$ pulse.

In the operation of the circuit of FIG. 2, assume that the computer connected to this circuit desires access to the common communications bus 10 of FIG. 1. In this case RU is negative indicating that the computer is running. This negative voltage level primes gate 34. The JK flip-flop was reset at the end of the last period of transmission by this computer so that D=0 and $\overline{D}$=1. The computer also applies the signals SJ=1, SK=0 to the JK flip-flop and maintains SJ=1 and SK=0. The flip-flop 26 therefore is in the condition depicted in row 4 of the table but with $\overline{D}$ initially 1, priming AND gate 24.

Figure 3:
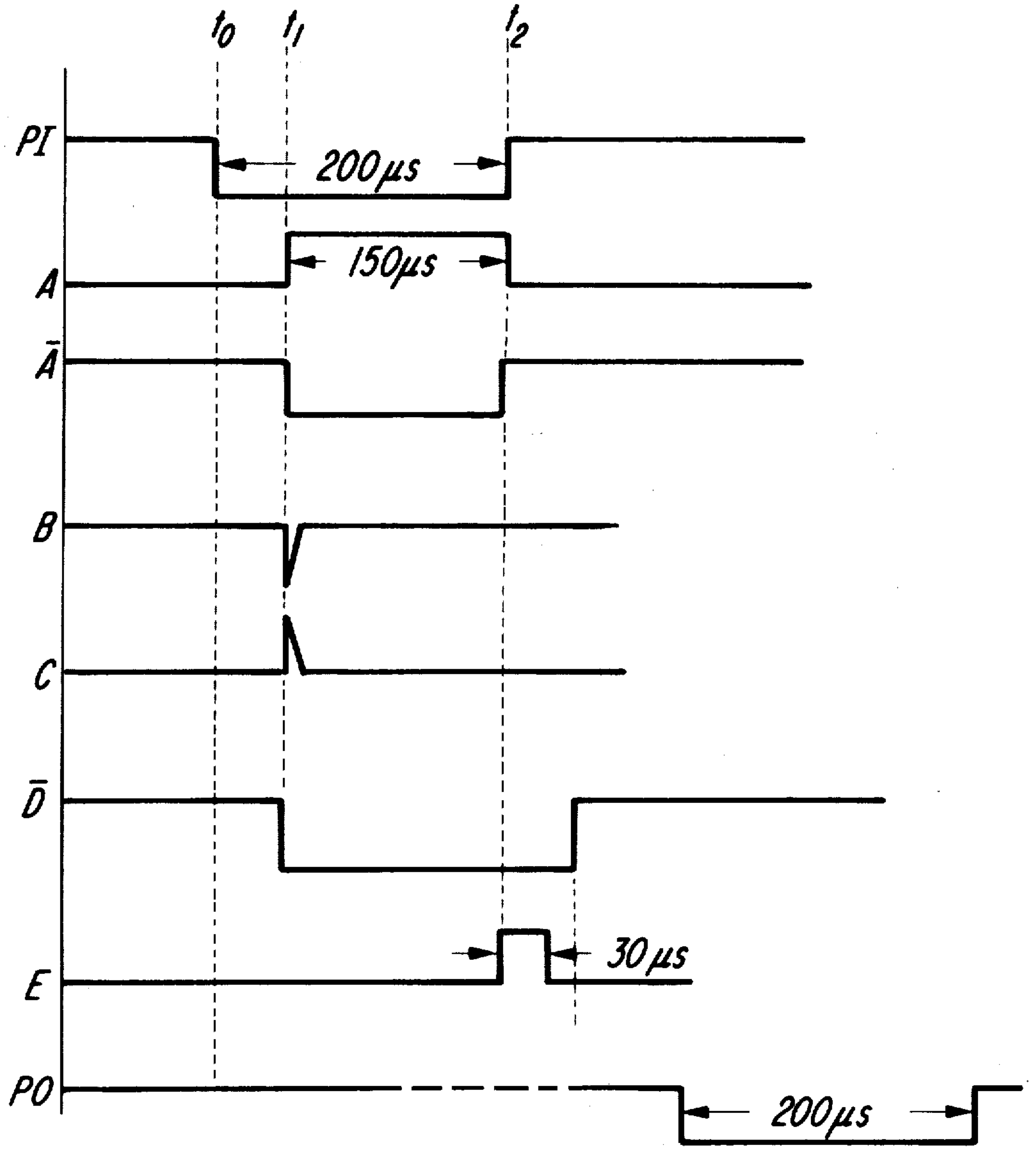
FIG. 3 is a drawing of waveforms present in the circuit of FIG. 2.

Assume now that a 200 microsecond negative-going signal PI appears at input terminal 14. Here and in the discussion which follows, both FIGS. 3 and 2 should be referred to. After the 50 microsecond delay inserted by delay line 18, gate 20 becomes enabled and A goes positive and $\overline{A}$ goes negative as shown in FIG. 3. In response to the leading edge of the pulse $\overline{A}$, the pulse generator 32 produces a negative-going pulse B as shown in FIG. 3. NOR gate 34 is primed by the negative voltage level RU so that the negative spike at B enables gate 34 and it produces a positive-going output pulse C. This positive-going output pulse sets flip-flop 26 so that D changes to 1 and $\overline{D}$ changes to 0. The $\overline{D}$=0 signal disables AND gate 24. The D=1 signal is fed back to the computer and signals the computer that it may have access to the communications bus.

Returning now to the upper portion of FIG. 2, the pulse A produced by gate 20 is applied to pulse generator 22. However, this pulse generator does not produce an output pulse until the lagging edge (the negative-going edge) of the pulse A occurs. Recall that $\overline{D}$ went negative disabling AND gate 24 at time $t_1$ (see FIG. 3). The positive-going pulse E occurs at time $t_2$ which is 150 microseconds later. Accordingly, the pulse E arrives at AND gate 24 after the latter has been disabled so that AND gate 24 does not produce an output pulse.

As mentioned above, the signal D=1 applied to the computer indicates to the computer that it may communicate via the communications bus 10. The computer does so by sending a code down the communications bus which is recognized by the computer with which it desires to communicate. For example, if the control circuit of FIG. 2 is the control circuit 12-1 of computer 1, computer 1 may send via the bus the identification code for computer 4. This code will be recognized by computer 4 and during a convenient interrupt interval it may signal back to computer 1 that it is ready to communicate.

Thereafter, the two computers will complete their communications, generally in a short interval of time such as a second or less, and at this time the computer 1 will indicate to its control circuit that it now desires to relinquish control of the communications bus. It does this by applying a signal ST=1 to OR gate 28. While not critical, the pulse ST may have a duration, for example, of say 10 microseconds. In response to this pulse, OR gate 28 will produce an output of similar duration. The pulse generator 30 responds to the lagging edge of this pulse and produces a negative-going output pulse PO which is roughly of the same duration and amplitude as the pulse PI. This pulse PO is applied via the common control line to the input terminal 14 of the control logic circuit for the next computer.

When the computer desires to relinquish control of the communications bus, it also applies a reset signal to the JK flip-flop 26 roughly concurrently with the signal ST. This signal resets the flip-flop 26 (D becomes 0 and $\overline{D}$ becomes 1). After the flip-flop is reset, the computer applies the signals SJ=0, SK=1 to the flip-flop. With signals of these values, and with D=0, $\overline{D}$=1, the flip-flop 26 is in a condition in which any change in the value of C has no effect on the flip-flop state (see row 3 of the truth table above).

Assume now that the control circuit is in the condition just discussed above the pulse PI arrives at its input terminal 14. Now, just as previously, the signals $\overline{A}$, B and C are generated. However, the signal C does not set the flip-flop 26 and $\overline{D}$ remains 1 priming AND gate 24. The signal A is generated as shown in FIG. 3 and in response to the lagging edge of this pulse, pulse-generator 22 produces a positive pulse E of 30 microseconds duration. This enables AND gate 24 and it produces a pulse F. In response to this pulse, OR gate 28 produces a pulse G which is of the same duration as and roughly time coincident with pulse E. In response to the lagging edge of pulse E, the pulse generator 30 produces an output pulse PO. In this instance, the leading edge of the output pulse PO is delayed relative to the leading edge of the input pulse PI, an interval of 230 microseconds.

Figure 4:
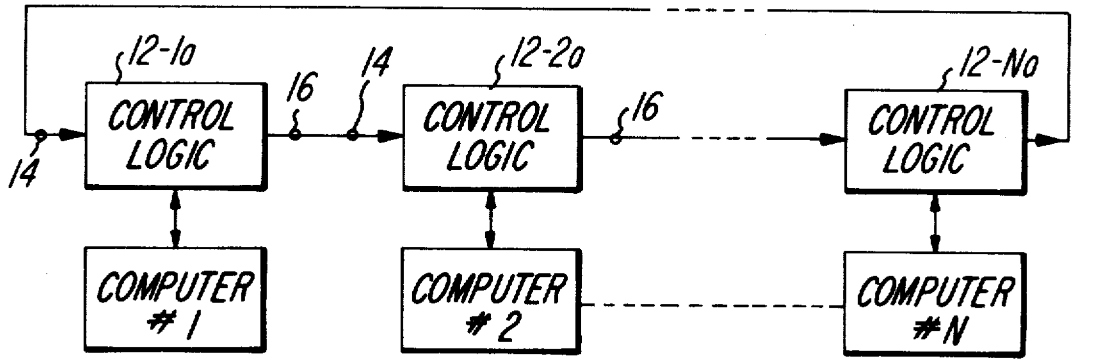
FIG. 4 is a block diagram of another system embodying the invention.

In the embodiment of the invention discussed above, bytes of information may be transmitted from computer to computer in parallel over a multiple conductor bus. Alternatively, the communications bus 10 may have only a single conductor (with the ground return implied) for the transmission of bits serially. A third alternative is illustrated in FIG. 4. Here, both the control information and the data which one computer desires to communicate to the next is transmitted over the same control wire (again with the ground return being implied). In this system the $j$'th computer receives its data from the $j \ominus 1$'th computer and transmits to the $j \oplus 1$'th computer. In both the case of control data and information, all signals travel via the control logic circuits **12-1*a*, 12-2*a*** and so on.

Figure 5:
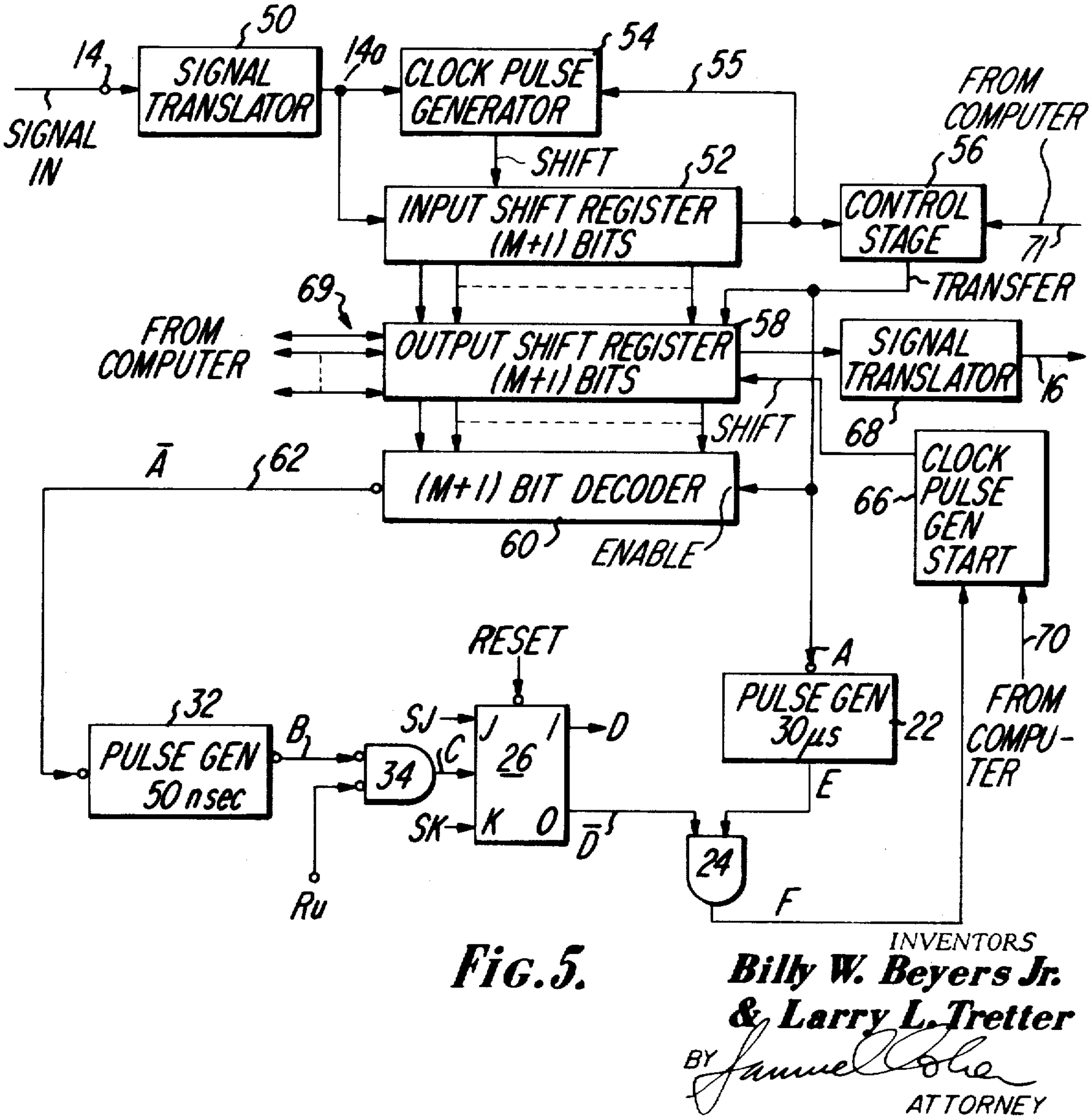
FIG. 5 is a block diagram of another control logic circuit according to the invention, this one for the FIG. 4 system.

A typical control logic circuit is shown in FIG. 5. As in the previous arrangement, the various control logic circuits **12-1*a*, 12-2*a* and so on are identical so that only one of them will be discussed in detail. In addition, those components in the FIG. 5 system which are either identical or quite similar in function and structure to the corresponding elements in FIG. 2** are identified by the same or similar reference characters.

The circuit of FIG. 5 includes a signal translator 50 connected to the signal input terminal 14. (Similar structure here and at 68 may be included in the FIG. 2 circuit, but for the sake of drawing simplicity it is not shown there.) The signal translator may be a commercially available unit such as a Modem or the like and its purpose is to translate, for example, an audio tone to a direct voltage level.

The output line **14*a* of the signal translator is connected to an input shift register 52 and to a clock pulse generator 54. This line 14*a* normally carries a level indicative of a 1 during the periods between the transmission of bytes. In response to the first bit of a serially received byte, which first bit always has the value 0, the clock pulse generator 54 is started. Thereafter, the clock pulse generator produces the number of shift pulses needed for shifting the serially received $M+1$ bits of a byte into the input shift register 52 and then turns off. Several alternatives are available for the clock pulse generator. It may be one of the free-running type which is turned on by the first 0 and which turns itself off after it has produced the required number of clock pulses to fill the register 52 with the $M+1$ bits of a byte. As a second alternative, the generator 54 may derive from the successive bits the clock pulses needed to shift them into the register (self-clocking). As a third alternative, the clock pulse generator may be turned off in response to a signal produced by the register 52 when the latter is full. This may be achieved by always resetting register 52 to all 1's after its contents are transferred to register 58 and sensing for the first 0 which reaches the last stage. This last alternative is the one schematically illustrated in FIG. 5 by the feedback line 55**.

The number $M$ may be some convenient value such as 6 or 8 or the like. The additional bit (the reason each register has a capacity $M+1$ rather than $M$) is always a 0 — the value of the first bit, this 0 being used to start the clock pulse generator 54.

The control stage 56 senses when the register 52 is full. One simple way this can be done is the one mentioned above, that is, to reset the register 52 to all 1's each time a word is transferred from 52 to 58 and then to sense for the first 0 reaching the last stage of the register. In response to this or another indication that register 52 is full, the control stage 56 applies a transfer pulse A of, for example, 150 $\mu$s to the input gates of the output shift register 58 causing the $M+1$ bits stored in the input shift register 52 to transfer to the output shift register.

The output shift register is connected to an $M+1$ bit decoder 60 and the decoder output line 62 is connected to pulse generator 32. The decoder produces an output of value 0 in response to an $M+1$ bit control byte stored in the decoder when the decoder is enabled by the pulse A from the control stage. The control code indicates to the control circuit that its computer may communicate via the common communications line, that is, it performs the same function in the FIG. 5 circuit that PI does in the FIG. 2 circuit.

The stages 32, 34, 26, 24 and 22 are analogous to the like numbered stages of the FIG. 2 circuit. Finally, the circuit of FIG. 5 includes a clock pulse generator 66 for shifting the bits stored in register 58 to the output terminal 16 via a signal translator 68, the latter being analogous to the signal translator 50.

In the operation of the circuit of FIG. 5, assume that the computer connected to this circuit desires access to the single communications line. In this case, RU is negative indicating that the computer is running and this negative voltage primes gate 34. The JK flip-flop 26 was reset by its computer at the end of the last period of transmission so that D=0 and $\overline{D}$=1. The computer also applies the signals SJ=1, SK=0 to the JK flip-flop and maintains these signals at these values. The flip-flop 26 therefore is in the condition depicted in row 4 of the table but with $\overline{D}$=1 initially, priming AND gate 24.

Assume now that the control code indicating that the communications line is available starts arriving at input terminal 14. The signal translator 50 translates this serial code to serially occurring pulses at 14*a*. The first pulse of this code represents a 0 and the remaining pulses can be any arbitrary, agreed to in advance, code. The $M+1$ bit decoder 60 is responsive to this code.

The first bit of this $M+1$ bit byte starts the clock pulse generator 54 and it shifts the successive bits into the input shift register 52. When the first bit arrives at the last stage of the shift register, it is applied to the clock pulse generator 54 turning the latter off and to the control stage 56 causing the latter to generate a transfer pulse. This pulse causes the bits stored in the input shift register 52 to the output shift register 58.

The $M+1$ bit decoder 60 senses the presence of the control code in the output shift register 58. In response to the enable signal A and the control code, the signal $\overline{A}$ on lead 62 goes negative corresponding to the negative-going edge of signal $\overline{A}$ of FIG. 3. In response thereto, pulse generator 32 generates a negative spike B and gate 34 produces a positive-going spike C, all as shown in FIG. 3.

As mentioned above, flip-flop 26 initially is in the reset state (D=0, $\overline{D}$=1) and SJ=1, SK=0. Accordingly, the positive pulse C causes the flip-flop to change state, that is, D changes to 1 and $\overline{D}$ changes to 0. All of this occurs at time $t_1$ in FIG. 3. AND gate 24 is therefore disabled. 150 microseconds later, the pulse generator 22 generates the positive pulse E, however, this has no effect as gate 24 is disabled by $\overline{D}$=0.

The signal D=1 indicates to the computer that it has "captured" the control code and that it may communicate via the single line. The computer thereupon first clears the output shift register and then directly transfers the first byte it wishes to transmit to the output register 58 via the lines 69. Concurrently, the computer applies a signal via lead 70 to the clock pulse generator 66 and the latter serially shifts the first byte of information bit-by-bit from the output shift register through the signal translator to the output terminal 16 which is connected to the common line. The clock pulse generator 66 may be one of the type which is started each time a byte is to be transmitted and, after it is started, produces only the number of pulses needed to shift one byte out of the register and then turns off. (Other alternatives are also available.)

The computer also disables the transfer control by putting a "0" on lead 71 for the duration of the message transmission. This prevents any transmitted information from reentering the output shift register 58 after going around the loop (see FIG. 4).

The above process continues byte-after-byte until the transmission is completed. Then the computer transfers to the output shift register the control code byte via lines 69. Concurrently, it resets the JK flip-flop 26 and applies the signals SJ=0, SK=1 to the flip-flop. This causes the flip-flop 26 to remain in the reset state, that is, $\overline{D}$ remains equal to 1 regardless of what happens to C. When the last bit of the control code is shifted out of the output shift register 58, the computer enables the control stage by applying a "1" thereto via line 71.

If the computer associated with the FIG. 5 circuit does not desire to communicate in response to a control code, it re-transmits that control code after a short delay interval. The control code byte is received by register 52 and transferred to the output shift register 58 in the same manner as already described. The JK flip-flop was reset at the end of the last communication period and if the computer does not desire to communicate, SK=1 and SJ=0. Thus, $\overline{D}$ is 1 and remains 1 priming gate 24.

The decoder 60 produces a negative-going output $\overline{A}$ in response to the control code and the pulse generator 32 produces the negative pulse B during time $t_1$. The pulse generator 22 subsequently produces output pulse E as shown in FIG. 3 and the AND gate 24 produces the pulse F which starts the clock pulse generator. The latter shifts bits stored in the shift register 58 out of the shift register to the output terminal 16. Assuming that the clock pulses start concurrently with the leading edge of the pulse E, the first bit of the control word is shifted out of the output shift register to the output line 150 microseconds after it is transferred from the input shift register to the output shift register. If the computer does not desire to communicate and if the byte received is not the control code, the decoder does not produce an output $\overline{A}$, no pulse occurs at B or C, $\overline{D}$ remains 1 but the pulse A causes a pulse E and since $\overline{D}$ enables gate 24 a pulse F is produced by gate 24. This starts the clock pulse generator and the byte is shifted out of 58 and to the translator 68. Thus, information from any computer readily may be communicated to any other computer even in the cases in which one or more control logic circuits are present in the transmission path.

Operation of the system in the receiving mode should be reasonably simple to follow from the explanation which has been already given. In this mode, the successive bits of each byte arriving at input terminal 14 are translated at 50 and are shifted into the shift register 52 by the clock pulse generator 54. Each time a byte accumulates, it automatically is transferred from the input shift register to the output shift register 58 and from there may be transferred, in parallel, via lines 69, to the computer. The decoder 60 is not affected by these information bytes as it is "tuned" only to the control code byte. After each byte is shifted from the input register to the output register, the input register 52 may be reset to all 1's and be ready for receipt of the next byte.

When the communication is completed, the last byte received will so indicate to the computer and the latter will then reset the input register 52 to all 1's and return to its process control mode. At this time, the JK flip-flop 26 will be in its reset condition and the computer will apply appropriate values of signals SJ and SK to the flip-flop to indicate whether or not it wishes to communicate the next time it receives the control code byte.

In both systems discussed above, the control logic circuits associated with each computer include additional logic stages not of interest in the present application. These are neither discussed nor shown. In addition, these circuits may include amplifiers for amplifying the signal level and as these are not essential for an understanding of the invention, they too have been omitted. It is also to be understood that the logic circuits shown are given by way of example only as many different variations, all falling within the scope of the present application, are possible. For example, a set-reset flip-flop with an AND gate at its set input terminal may be substituted for the JK flip-flop. Here, the signal C serves as one input to the AND gate and a signal from the computer as its second input. In the operation of this modification, the computer initially resists the flip-flop by applying a signal to the reset terminal of the flip-flop, then it either primes or disables the AND gate depending upon whether it does or does not desire access to the communications bus. Other equally straightforward substitutions also may be made.

An important feature of the systems of the present application is that they are relatively easily expandable and also it is relatively easy to remove one or more computers. To expand a system, the line extending between the output circuit of one control logic circuit and the input circuit of the next control logic circuit is broken and the control logic for the new computer is simply inserted. In addition, the new computer is appropriately connected to the control logic circuit and in the case of FIG. 1, to the communications bus. The operation of the system remains unchanged except that it takes the control pulse PI, PO (or the control byte in the case of FIG. 4) a longer time to travel around the control loop. To remove a computer from the system, it and its control logic circuit are simply taken out and the free ends of the broken control line joined. Again, the operation of the system is substantially unaffected except that it now takes the control pulse a shorter time to travel around the loop. In both cases, the "software" associated with each computer need not be changed and this in itself is a very important advantage.

Another feature of the present invention is that the transmission delay from one computer to the next does not adversely affect the system operation. Thus, one computer may be right next to a second computer and a third computer be at the other end of a long building or even in another building so that the transmission times between different computers may be widely different without interfering with the system operation.

What is claimed is:

1. In a multiple computer system which includes $n$ computers, in combination:

$n$ control circuits, each connected to a different computer, each $j$'th such circuit having an input terminal connected to the output terminal of the $j\ominus 1$'th control circuit and an output terminal connected to the input terminal of the $j\oplus 1$'th control circuit, where $j=1, 2 \ldots n$;

means in each control circuit receptive of a control signal manifestation at its input terminal for applying a corresponding signal manifestation to its output terminal, said means comprising delay means and a pulse generator coupled to said delay means;

a communications channel common to all computers to which said computers are all coupled; and means in each control circuit responsive to a signal from its computer requesting access to said channel, for indicating to its computer, upon receipt of a control signal manifestation, that it may have access to said channel and for concurrently preventing that control circuit from applying said corresponding signal manifestaTion to its output terminal until the computer has completed its period of access to the channel, said means including means for initially preventing the application of an input signal to said pulse generator, and means for applying a signal to said pulse generator for activating the latter when said computer has completed its period of access to the channel.

2. In a multiple computer system as set forth in claim 1, said means for initially preventing the application of an input signal to said pulse generator comprising logic gate means in the path between said delay means and said pulse generator, and means responsive to said signal requesting access and to said control signal manifestation for disabling said logic gate means.

3. In a multiple computer system as set forth in claim 1, said communications channel comprising a multiple conductor bus which is independent of said control circuits.

* * * * *